(12) United States Patent
Willett

(10) Patent No.: US 12,446,280 B2
(45) Date of Patent: Oct. 14, 2025

(54) METHOD TO ACCESS FIBONACCI ANYONS FOR TOPOLOGICIAL QUANTUM COMPUTATION IN A CORRELATED TWO-DIMENSIONAL ELECTRON SYSTEM

(71) Applicant: Nokia Technologies Oy, Espoo (FI)

(72) Inventor: Robert Willett, Warren, NJ (US)

(73) Assignee: Nokia Technologies Oy, Espoo (FI)

( * ) Notice: Subject to any disclaimer, the term of this patent is extended or adjusted under 35 U.S.C. 154(b) by 191 days.

(21) Appl. No.: 18/337,949

(22) Filed: Jun. 20, 2023

(65) Prior Publication Data
US 2025/0151351 A1    May 8, 2025

Related U.S. Application Data

(60) Provisional application No. 63/353,842, filed on Jun. 21, 2022.

(51) Int. Cl.
| | | |
|---|---|---|
| *H10D 62/81* | (2025.01) | |
| *H10D 62/815* | (2025.01) | |
| *G11C 11/18* | (2006.01) | |

(52) U.S. Cl.
CPC .......... *H10D 62/8161* (2025.01); *G11C 11/18* (2013.01)

(58) Field of Classification Search
CPC ............................ H10D 62/8161; G11C 11/18
See application file for complete search history.

(56) References Cited

U.S. PATENT DOCUMENTS

| | | | |
|---|---|---|---|
| 7,394,092 B2 * | 7/2008 | Freedman | G06N 10/20 257/14 |
| 7,547,648 B2 | 6/2009 | Ruess et al. | |
| 7,960,714 B2 | 6/2011 | Baldwin et al. | |
| 8,324,120 B2 | 12/2012 | Baldwin et al. | |
| 8,362,461 B2 | 1/2013 | Baldwin et al. | |

(Continued)

FOREIGN PATENT DOCUMENTS

EP    2786410 B1    5/2016

OTHER PUBLICATIONS

Willett et al., "Interference measurements of non-Abelian e/4 & Abelian e/2 quasiparticle braiding", arXiv, Mar. 8, 2023, pp. 1-60.
(Continued)

*Primary Examiner* — Vanthu T Nguyen
(74) *Attorney, Agent, or Firm* — Nokia Technologies Oy

(57) ABSTRACT

A method is provided for operating a fractional quantum Hall apparatus including a set of interferometers, each having a cell and a set of gate electrodes located around the cell. The method includes calibrating each one of the interferometers to confine a droplet of a 2D charge carrier gas in a fractional quantum Hall effect state of filling factor 17/5 or 12/5, while a reentrant phase of integer quantum Hall effect states of the 2D charge carrier gas is located between the area of the droplet in a fractional quantum Hall effect state and the interferometer electrodes. The calibrating includes setting a value of a magnetic field across the apparatus such that the reentrant phase and the droplet of the 2D charge carrier gas are present in at least one of the interferometers based on interference measurements on at least one of the interferometers for different values of the magnetic field.

14 Claims, 8 Drawing Sheets

(56) References Cited

U.S. PATENT DOCUMENTS

| | | |
|---|---|---|
| 8,987,703 B2 | 3/2015 | Willett |
| 9,721,209 B2 | 8/2017 | Kliuchnikov et al. |
| 10,177,297 B2 | 1/2019 | Marcus et al. |
| 10,204,305 B2 | 2/2019 | Freedman et al. |
| 11,342,017 B2 | 5/2022 | Willett |
| 2007/0194225 A1 | 8/2007 | Zorn |
| 2021/0247917 A1 | 8/2021 | Willett |

OTHER PUBLICATIONS

Chung et al., "Surface segregation and the Al problem in GaAs quantum wells", arXiv, Apr. 12, 2018, pp. 1-5.

Bordone et al., "Quantum computing with quantum-Hall edge state interferometry", Semiconductor Science and Technology, vol. 34, No. 10, 2019, pp. 1-27.

U.S. Appl. No. 17/582,800, "Optically Transparent Surface Gate for a Qubit Memory Cell", filed Jan. 24, 2022, pp. 1-20.

Extended European Search Report received for corresponding European Patent Application No. 22193613.1, dated Jun. 2, 2023, 9 pages.

Nakamura et al., "Aharonov-Bohm interference of fractional quantum Hall edge modes", arXiv, Jan. 24, 2019, 18 pages.

Papić et al., "Fractional quantum Hall effect in semiconductor systems", arXiv, May 6, 2022, pp. 1-22.

Trebst et al., "A Short Introduction to Fibonacci Anyon Models", Progress of Theoretical Physics Supplement, vol. 176, Jun. 2008, pp. 384-407.

Sagodi et al., "The qudit in the Fibonacci anyon model", Thesis, Jul. 14, 2017, 62 pages.

\* cited by examiner

METHOD TO ACCESS FIBONACCI ANYONS FOR TOPOLOGICIAL QUANTUM COMPUTATION IN A CORRELATED TWO-DIMENSIONAL ELECTRON SYSTEM

CROSS-REFERENCE TO RELATED APPLICATIONS

This application claims the benefit of U.S. provisional patent application No. 63/353,842, filed on Jun. 21, 2022, which is incorporated herein by reference in its entirety.

TECHNICAL FIELD

The invention relates generally to semiconductor quantum well devices and to methods for making and using such devices.

BACKGROUND OF THE INVENTION

This section introduces aspects that may be helpful to facilitating a better understanding of the inventions. Accordingly, the statements of this section are to be read in this light and are not to be understood as admissions about what is prior art or what is not prior art.

Quantum computing devices have been made or proposed based on various technologies, including those relating to superconducting junction devices, ion-trap devices, and fractional quantum Hall effect (FQHE) devices. In any of these technologies, it is typical to use a memory structure to store values of quantum states, and to use hardware to write the state values to the memory structure and to read the states from the memory structure. Implementations of the memory structures and of the read/write hardware differ among the various technologies.

FQHE devices have attracted interest in this regard, not least, because they show promise of storing quantum states that remain coherent for exceptionally long periods of time, up to timescales of hours or more. In a FQHE device, a two-dimensional charge-carrier gas (2DCCG) is trapped within a quantum well fabricated in a semiconductor heterostructure. In a strong externally applied magnetic field, and generally at cryogenic temperatures, manifestations of the FQHE emerge as a result of collective effects among the trapped charge carriers.

More specifically, phenomena associated with the integer or fractional quantum Hall effect are observed when certain equilibrium states of the trapped carrier gas form at specific values of a parameter v, referred to as the filling factor, which expresses the ratio of the areal density of electrons to the areal density of magnetic flux quanta. The Landau levels are energy states that arise due to quantization of charged carrier cyclotron orbits in the presence of the applied magnetic field. In the integer quantum Hall effect, these equilibrium states occur at integer values of v, such as 1, 2, 3, etc., i.e., for 1, 2, 3, etc. filled Landau levels. In the fractional quantum Hall effect, special equilibrium states form when v assumes fractional values such as 1/3, 2/5, 3/7, etc. The fractional values are a consequence of the electron correlations that produce the FQHE equilibrium states, also resulting in excitations of the states, referred to as quasiparticles.

In FQHE states, the trapped carrier gas can behave as an incompressible fluid droplet. (The term "droplet" is chosen for convenience, and should not be understood to imply properties, such as convexity, associated with room-temperature water droplets and the like.) Edge excitations, which are excitations localized at the edges of the droplet, may produce currents that flow along these edges. An edge excitation has a phase. If the associated current circulates around the droplet, the phase will be sensitive to the quasiparticle population within the droplet, and it may change when the quasiparticle population is changed. These phase changes can be observed, for example by interferometry. Thus, changes in the state of excitation within the fluid droplet can be detected.

Devices have been proposed for quantum computation based on FQHE states. That is, states composed of multiple excitations can potentially be used to represent states of a qubit in a quantum computer. Interferometric devices have been suggested for defining the FQHE states, changing them, and performing computations with them. That is, an interferometric device can potentially be used to write and read a qubit, and to enable interactions among qubits that would, e.g., implement a quantum logic gate.

It is significant in this regard that FQHE states of some interest for quantum computation may be topological states described by non-Abelian statistics. States of that kind are very robust against physical perturbations. For that reason, it has been suggested that in a quantum computer, the utilization of these states could drastically reduce susceptibilities to calculational errors, relative to other realizations of quantum computers.

Various FQHE states have been proposed for use in devices for quantum computation based, e.g., on Ising anyons and Fibonacci anyons.

U.S. Pat. No. 11,342,017 contains a discussion of the operation of FQHE interferometers. US patent application publication 2021/0247917 discusses topologies for coupling FQHE qubit cells based on interferometers. The entirety of each of these publications is hereby incorporated herein by reference.

SUMMARY

The present disclosure relates to a method for operating an apparatus including a set of interferometers located along a surface of a substrate. The substrate has a quantum well operable to trap a 2D charge carrier gas such that the trapped 2D charge carrier gas extends along the surface. Each interferometer has a cell and a set of gate electrodes located around the cell.

In first embodiments, the method comprises calibrating each one of the interferometers to confine a droplet of the 2D charge carrier gas in a fractional quantum Hall effect state of filling factor 17/5 or 12/5 in an area of the cell of the interferometer, while a reentrant phase of integer quantum Hall effect states of the 2D charge carrier gas is located between the area of the droplet that is in a fractional quantum Hall effect state and the electrodes of the interferometer. The calibrating includes setting a value of a magnetic field across the substrate such that the reentrant phase and the droplet of the 2D charge carrier gas are present in at least one of the interferometers based on interference measurements on the at least one of the interferometers for different values of the magnetic field.

In any of the first embodiments, the method may further include measuring or varying a topological property of the droplet of the 2D charge carrier gas confined in one or more of the interferometers of the set while maintaining the calibration of the interferometers.

In some of the first embodiments, the method may further include manipulating the 2D charge carrier gas while maintaining the calibration of the interferometers to perform one or more of the following operations: reading a qubit value stored in a selected one of the calibrated interferometers, storing a qubit value to the selected one of the calibrated interferometers, and performing a braid operation of qubit states confined to two or more selected ones of the calibrated interferometers.

In any of the first embodiments, the substrate may include a group III-V semiconductor heterostructure. The heterostructure includes a primary quantum well having an InGaAs or GaAs well layer between AlGaAs barrier layers, wherein each AlGaAs barrier layer includes a shielding quantum well, and also includes a silicon dopant layer located such that one of the shielding quantum wells is between the silicon dopant layer and the InGaAs or GaAs well layer.

In any of the first embodiments, the interference measurements may be used, in calibration, to determine whether a reentrant phase of integer quantum Hall effect states of the 2D charge carrier gas is present in at least one of the interferometers.

In any of the first embodiments, the method may further include illuminating the substrate to increase a density of the charge carriers in the 2D charge carrier gas, stopping the illuminating, and then, applying voltages to the gate electrodes to form the droplets in the interferometers. In some such embodiments, in the event of a determination that a reentrant phase is not present, the calibration may further include re-illuminating the substrate, and after stopping the re-illuminating, using interference measurements to determine whether a reentrant phase of integer quantum Hall effect states of the 2D charge carrier gas is then present. In some embodiments of this paragraph, the calibration may further comprise, while varying the magnetic field, measuring oscillations in the interference measurements due to some or all of: Aharonov-Bohm oscillations, statistical phase oscillations, and oscillations due to a quasiparticle number change of a non-abelian state for the filling factor 12/5 or the filling factor 17/5. In further embodiments, in the event of a failure to observe oscillations of one or more such types, the calibration may further include re-illuminating the substrate; and after stopping the re-illuminating, repeating the varying the magnetic field and, while varying the magnetic field, measuring oscillations in the interference measurements due to some or all of those types. In any embodiments of this paragraph, the charge carriers of the 2D charge carrier gas may be electrons and the illuminating may cause a bulk density of the electrons in the 2D charge carrier gas to be greater than, substantially, $4 \times 10^{11}$ per square centimeter of the surface.

In any of the first embodiments, each of the interferometers may include a set of side electrodes and a set of backscattering electrodes, and the method may further include applying voltages to the side electrodes of a specific one of the interferometers to deplete an area around its cell of the 2D charge carrier gas, and adjusting voltages applied across the backscattering electrodes of the specific one of the interferometers to change a backscattering of edge excitations of the droplet thereby.

In some of the first embodiments, a pattern comprising one or more dot electrodes may overly the cell of the specific one of the interferometers, the electrode or electrodes of the dot pattern being electrically isolated from the side and backscattering electrodes of the specific one of the interferometers, and the method may further comprise applying a voltage to a selected one of the dot electrodes of the dot pattern such that a charge becomes localized in the 2D charge carrier gas near the selected dot electrode. In some such embodiments, the method may further include varying a voltage applied to the selected dot electrode such that a charge becomes localized in the 2D charge carrier gas near a different one of the one or more dot electrodes. In some embodiments, the method further comprises varying a voltage applied to the selected dot electrode such that a charge moves between adjacent facing backscattering electrodes. In some embodiments of this paragraph, the method may further include varying a voltage applied to the selected dot electrode such that a charge is shifted from a localized position at the selected dot electrode to one of the side electrodes or one of the backscattering electrodes of the specific one of the interferometers.

DETAILED DESCRIPTION

Figure 1:
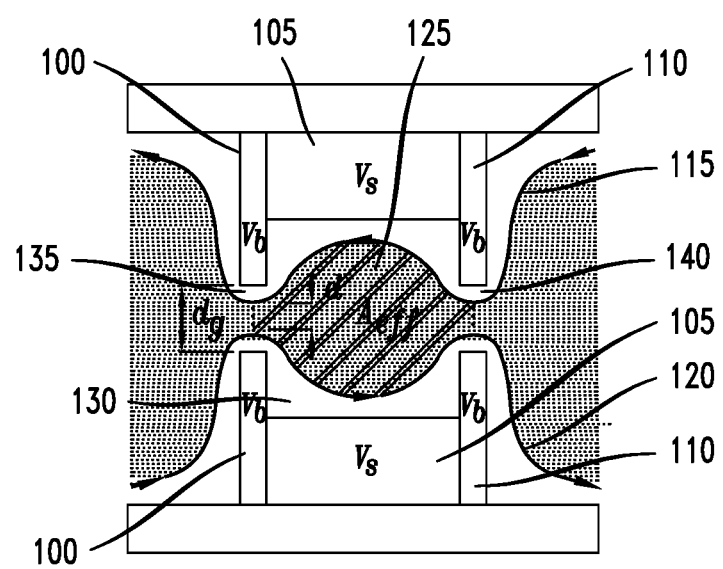
FIG. 1 is a schematic representation, in plan view, of an interference device for edge currents of the kind described here.

FIG. 1 is a schematic representation of an interference device for edge currents as seen in plan view. One cell is shown; the cell is configured to function, for edge states of a FQHE charge carrier droplet, in a manner analogous to how a Fabry-Perot interferometer operates for light. This cell is a basic element that can be replicated and assembled into more complex structures to serve as memory cells and other devices for quantum computing operations. The interference device is fabricated on a semiconductor heterostructure, as will be explained in greater detail below.

The interferometer is defined by pairs of surface gate electrodes 100, 105, 110, which are operated at voltage $V_b$ for gates 100 and 110 and at voltage $V_s$ for gates 105. At suitable, control values, these voltages deplete the carrier population below them. In the example presented here, the carriers are electrons. However, the possibility that holes, rather than electrons, constitute the 2DCCG is not excluded.

Between the depleted regions, there is a confined droplet 125 of incompressible quantum Hall (QH) fluid of said carriers of the 2DCCG. The effective area $A_{eff}$ of this droplet is marked in the diagram. More specifically, the area $A_{eff}$ is enclosed by the edge current, i.e., $A_{eff}$ is delimited by the innermost edge current. Because the carrier density within $A_{eff}$ is the bulk density, the confined droplet has, at a given applied magnetic field strength, the same filling factor as the bulk of the fluid outside the interferometer. It should be noted that in operation, the area $A_{eff}$ is smaller than the geometric area $A_{geom}$ defined by the layout of the surface gate electrodes. Between the outer boundary of $A_{eff}$ and the outer boundary of $A_{geom}$, there is an electron density gradient.

Currents 115, 120 propagate along the edges separating the incompressible quantum Hall (QH) fluid 125 from the depleted regions 130. At locations separated from the interferometer and not shown in FIG. 1, contacts are diffused into the heterostructure for measuring electrical resistance $R_L$ across the device in the longitudinal direction. Contacts may also be fashioned in Hall configuration for measuring electrical resistance $R_D$ across the device in the transverse direction.

As will be explained below, the resistance $R_L$ provides an observable indication of interference that takes place in the interferometer, and it thus may provide an interferometer output signal.

As will be seen in the figure, the surface gates, in operation, create constrictions 135, 140 of the QH fluid droplet. Edge current can cross between the upper and lower edges at each of the two constrictions. That is, an edge excitation can tunnel from one edge to the other, as indicated in the figure by the broken lines at constrictions 135 and 140. The lateral separation between the gates at the constrictions is indicated in the figure as $d_g$. However, the actual tunneling distance between the edge currents, indicated as d in the figure, is controlled by the gate voltage $V_b$.

Because of the backscatter, an edge current exiting the interferometer cell will contain a contribution that has laterally encircled the region $A_{eff}$ of the interferometer, and also a contribution that has not laterally encircled the region $A_{eff}$. Depending on the excited states that may be present within the confined fluid drop, the encircling contribution can acquire a different phase from the non-encircling contribution. This phase difference can cause interference, which is detectable because it modulates the longitudinal resistance $R_L$, which can be measured. For example, resistance oscillations may be observed as the applied magnetic field is swept in value.

More specifically, changes in the magnetic flux number within area $A_{eff}$ or changes in the particle number within area $A_{eff}$ will cause phase accumulation for the encircling path. Phase changes may occur due to Aharonov-Bohm phase contribution, and due to statistical phase contribution, both of which are known in the art.

Moreover, topological state is a degree of freedom of the QH fluid droplet that is changed by a braiding operation involving quasiparticles for non-Abelian states such as 5/2, 7/2, 12/5 and 17/5. Changes of the topological state can also be manifested by phase accumulation.

Interference between the encircling and non-encircling paths produces the above-mentioned oscillations in the resistance measured across the interference device.

The voltages $V_b$ on top gates 100, 110 can be adjusted to promote such backscattering, and the voltages $V_s$ on top gates 105 can be adjusted to change the enclosed area $A_{eff}$.

The distance marked $d_g$ in FIG. 1 should be sufficiently large that for nominal voltages $V_b$, the backscattering will be relatively weak, for reasons to be explained below. A sufficiently large value for $d_g$ will also promote a contiguous extent for 17/5 and 12/5 fractional Hall states, from outside to inside the active area $A_{eff}$ of the interferometer.

Further, it is advantageous for $d_g$ to be large enough to permit tuning of the gate voltages to induce stronger and weaker backscattering of quasiparticles, as measured by the non-Abelian Fibonacci anyon braiding oscillations shown in FIG. 8, which will be discussed below.

That is, the geometrical gap size affects the range of voltages needed. The voltage must lie within the range between the value that is just enough to achieve full depletion directly beneath the gates, and the value at which conduction in the gap is closed off. If the gap is too small, this range may be too narrow to permit a useful amount of tuning.

On the other hand, making the gap larger can increase the applied voltages that are needed to induce sufficient backscattering. Too large a gap could require applied voltages large enough to cause undesirable side effects such as leakage from the surface gate to the 2D carrier gas. Most desirable is a range of relatively low voltages that still offers backscattering in a usefully broad dynamic range.

It is noteworthy in this regard that because the backscattering is the product of a process of quantum tunneling through the bulk density, it responds exponentially to changes in voltage.

The charge of the edge-state carriers is dependent upon the bulk filling factor. The "bulk", as noted above, is the portion of the QH fluid that laterally lies outside the cell and that lies within area $A_{eff}$. That is, it is the portion that is substantially free of depletion effects.

If the bulk filling factor is an integer, the carriers are electrons, and thus they carry the fundamental electronic charge e. But if the bulk filling factor is fractional, the charge on the carriers is determined by the denominator of the fraction that describes the filling factor. Thus, for example, if the bulk filling factor is 1/3, the carriers will be quasiparticles of charge e/3, and if the filling factor is 2/5, the carriers will be quasiparticles of charge e/5.

U.S. Pat. No. 7,960,714 discusses manipulation of FQHE droplets to change their states of excitation. The entirety of this patent is hereby incorporated herein by reference.

Figure 2:
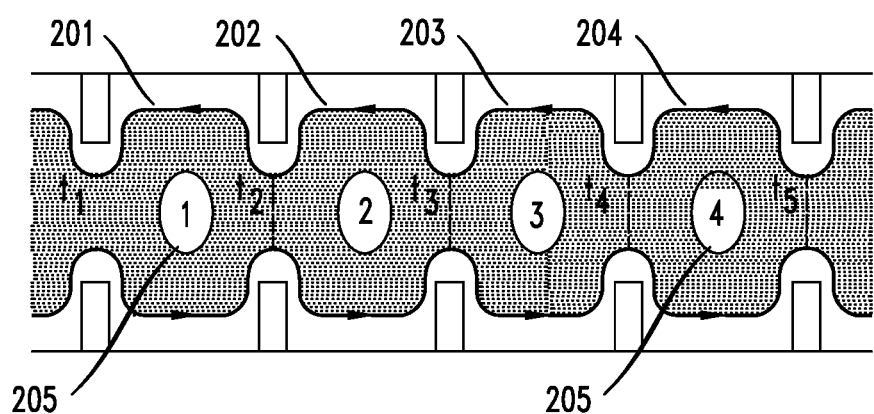
FIG. 2 is a schematic representation, in plan view, of a composite cell capable of supporting four serially connected droplet regions.

FIG. 2 is a schematic representation, seen in plan view, of a composite cell that could be useful for qubit operations based on FQHE states. The composite cell is constituted as a series of four end-connected interferometer cells 201-204 of the kind described above. The constrictions at the boundaries of the cells are labeled, in sequence, with transmission coefficients $t_1$-$t_5$. These coefficients describe the amount of transmission of edge current, due to backscatter, through the respective constrictions. These values can be individually adjusted by application of suitable voltages to the surface gate electrodes at the two sides of the constrictions.

Each of the cells shown in FIG. 2 includes a charging dot 205. The four charging dots 205 visible in FIG. 2 are respectively numbered from 1 to 4. The charging dot is a surface electrode similar to the surface gate electrodes 100-110 of FIG. 1. In FIG. 2, the charging dots are shown as situated at the centers of their respective cells. Although such a location may be useful for at least some purposes, a central location for the charging dots is not essential. A cell may contain more than one charging dot.

In implementations, electrical contact to each charging dot or other surface dot may be made via an air bridge. Voltages controllably applied to the charging dots are used to manipulate the charge states of the cells. In this manner, operations useful for quantum computation, such as braid operations, can be performed.

As few as three elementary charge manipulations may provide a sufficient basis for the operations necessary to store topological qubits and to perform quantum computations with them. We refer to these charge manipulations, respectively, as side-to-charging-dot, side-to-side, and charging-dot-to-charging-dot operations. These charge manipulations are respectively illustrated in FIGS. 3A, 3B, and 3C. In the figures, two charging dots, called out by reference numerals 301 and 302, are shown.

Figure 3A:
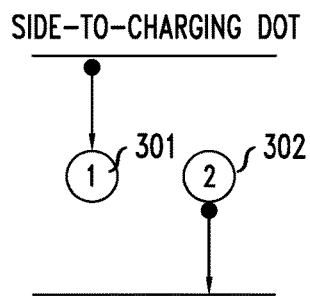
FIGS. 3A-3C are schematic illustrations of elementary charge manipulations that may be performed with apparatus described here, and that may be useful for storing topological qubits and for performing quantum computations.

In the side-to-charging-dot operation, as indicated in FIG. 3A, a charge is transferred from an edge to a charging dot, or from a charging dot to an edge. As explained above, the charge depends on the pertinent filling factor.

Figure 3B:
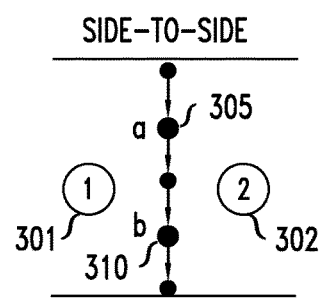
Figure 3C:
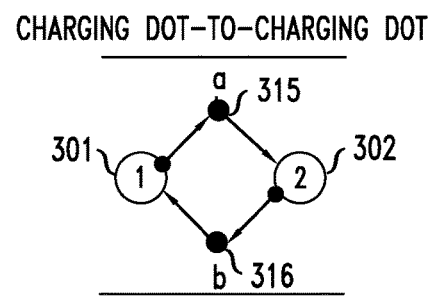

In the side-to-side operation of FIG. 3B, a charge is transferred from an edge to an opposing edge. This process may be abetted by additional electrodes, referred to as "helper dots", such as electrodes 305 and 310. With the assistance of the helper dots, the transfer may, for example, be achieved in multiple steps, such as the three steps that are illustrated by arrows landing on electrode 305, on electrode 310, and on the final side.

It was noted above that confinement of the 2DCCG within a cell is facilitated by a constriction serving as a backscattering port at each end of the cell. It should also be understood that a constriction between two cells can also facilitate charge-transfer operations. Thus, for example, a somewhat more extended constriction may contain helper dots for facilitating a charge transfer from one side of the device to the other.

In the charging-dot-to-charging-dot operation of FIG. 3C, helper dots may again be used. Thus, in the illustrated example, charge transfer from charging dot 301 to charging dot 302 is shown as proceeding in two steps: A transfer from charging dot 301 to helper dot 315, followed by a transfer from helper dot 315 to charging dot 302. A second two-step charge transfer is shown as proceeding, via helper dot 316, in the opposite direction.

Figure 4:
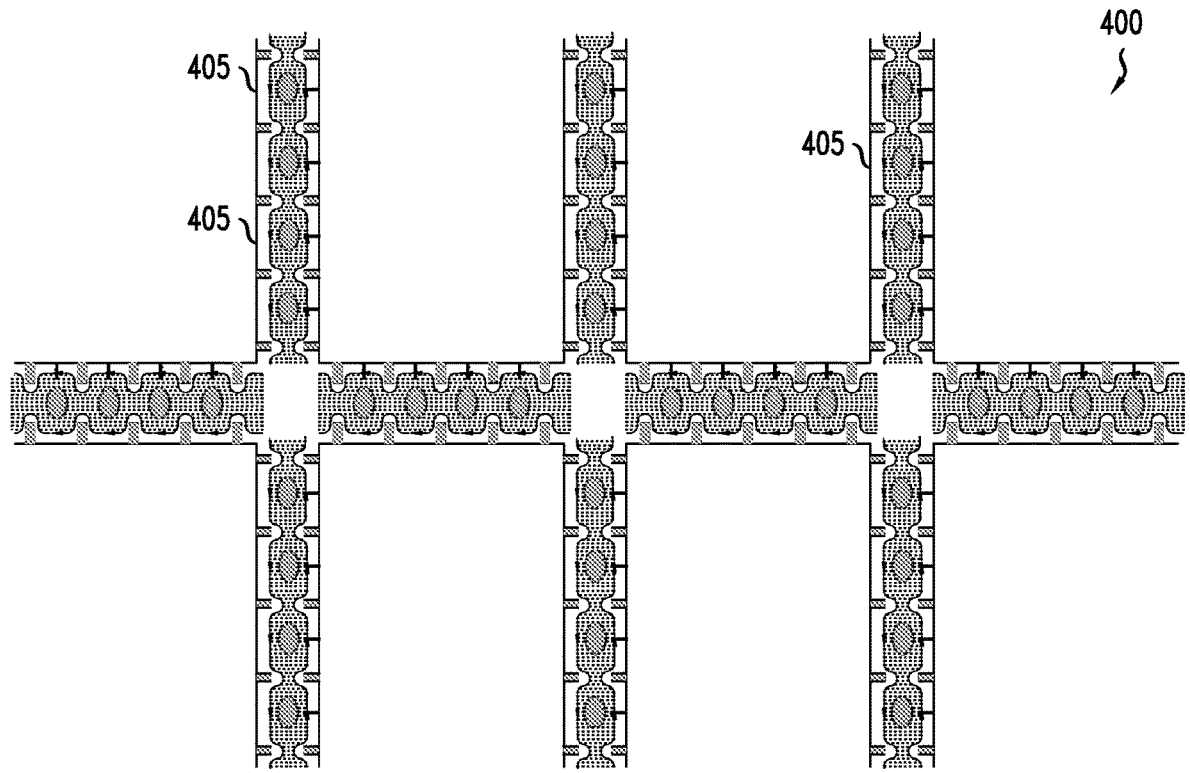
FIG. 4 is a notional illustration, in a schematic plan view, of a possible layout for a portion of a topological quantum computer.

Charge manipulations such as those described above can effectuate switching between topological states, e.g., in a topological quantum computer. FIG. 4 is a notional illustration of a possible layout 400 for a topological quantum computer in a schematic plan view. As seen, the layout is built up from cells 405, similar to the cells described above.

In layout 400, many surface electrodes overlie the same background quantum state of highly correlated electrons (or holes, in other possible implementations), i.e., a 2DCCG. Some of the surface electrodes are used to move charges so as to switch or control the desired quantum states. As will be discussed below, it is desirable for the underlying semiconductor heterostructure to be fabricated with very high purity, so as to provide high-mobility carriers. The higher the purity, the more robust the controllable quantum states will be, and the larger and more stable the output signals will be.

Fibonacci anyons at filling factors of 12/5 and 17/5 have been difficult to observe. One hindrance has been the emergence of re-entrant integer quantum Hall (RIQH) states at filling factors near 12/5 and 17/5. RIQH states are states in which Coulomb repulsion drives the electron system to minimize the total energy by segregating into areas of different electron densities. This is a form of phase segregation.

The inventor believes that such RIQH states can overlie and obscure the Fibonacci states, but the inventor has discovered that under favorable conditions, the presence of RIQH states at filling factors of 17/5 and 12/5 can enhance the interferometer signal from the desired Fibonacci states.

Figure 5:
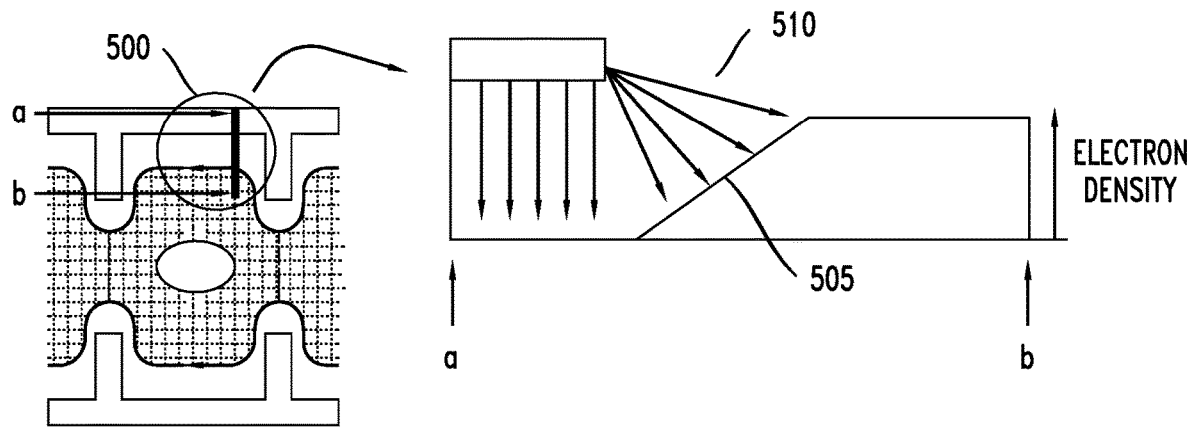
FIG. 5 shows, in the main portion of the figure, an interference device of the kind shown in FIG. 1. The detail of FIG. 5 illustrates the formation of an electron density gradient and an electric potential gradient in the vicinity of a section taken through a portion of the interference device.

The inventor believes that there is a density gradient between the bulk portion of the carrier fluid droplet marked as area $A_{eff}$ in FIG. 1, and the edge of each surface gate electrode. According to the inventor's belief, the density gradient is schematically illustrated graphically in FIG. 5, for pedagogical purposes.

In the left-hand part of the figure, a section a-b is indicated. This section extends through the portion of a cell indicated by circle 500, from part of a surface gate electrode, through the depleted region under and near the electrode, and into the bulk portion of the FQHE fluid droplet.

The right-hand part of the figure is a detail of the indicated portion of the cell, in cross section, shown in a highly simplified manner, which is not to scale. As shown in the figure, the electron density of the 2DCCG directly beneath the electrode edge is very low. The electron density increases in gradient region 505, up to the bulk electron density of the 2DCCG in the droplet. The local variation in electron density produces an electrical potential gradient, which is schematically illustrated in the figure by electric field lines 510. As portrayed in the figure, field lines 510 are meant as schematic only; no effort has been made to represent an actual field distribution.

If the density gradient from the bulk $A_{eff}$ to the surface gate (see FIG. 5) extends over a sufficiently large distance, RIQH phases can form within this density gradient, which is of smaller slope the larger the difference between $A_{eff}$ and $A_{geom}$. At bulk filling factors of 17/5 and 12/5, the RIQH phases are believed to be formable in immediate proximity to the edge of the bulk region of the FQHE droplet.

Under the applied magnetic field that produces the desired filling factor (i.e., 17/5 or 12/5) in the bulk portion of the fluid FQHE droplet, the local reduction in electron surface density near edges of the FQHE droplet is believed to produce, in the re-entrant phases, an electron density corresponding to integer filling factors, e.g., of 3, 2 and/or 1 (for a bulk factor of 17/5) or of integer filling factors of 2 and 1 (for a bulk factor of 12/5).

Although we do not wish to be limited by mechanism, our current belief is that an abrupt drop in electron density near the edge of the bulk region increases the electrical potential gradient in that region. The potential gradient is the driving force for the edge current. We believe that the nearby re-entrant phase has the effect of increasing the edge-current velocity. In addition, the self-organized density separation (i.e., the phase segregation) presents, to the edge current, a naturally conforming screening of disorder. Thus, the nearby presence of the re-entrant phase(s) is believed to tend both to increase the edge-current velocity and to suppress decoherence of the FQHE carrier droplet.

The 17/5 and 12/5 states are instances of Fractional quantum Hall states at filling factors greater than 2.

Interferometric detection of the edge-propagating quasiparticles relies on their coherent transport along the edge of the bulk region having the requisite filling factor. Thus, for detection, edge propagation channels with relatively high edge velocity and thus, relatively low transport times are desirable.

Herein, it is noted that the interferometer of FIG. 1 is a sub-unit of the structure for storing one qubit.

Growth of example heterostructure. The example heterostructure is grown by molecular beam epitaxy (MBE). The heterostructure composition in our example implementation is GaAs/AlGaAs. However, the principles described here should not be understood as limited solely to the GaAs/AlGaAs material system, or indeed, to any particular III-V material system, or even as limited solely to III-V material systems. For example, a possible alternative to the primary quantum well layer of GaAs described below is a primary well layer of InGaAs.

The heterostructure is advantageously operated with an electron density in the 2D electron gas that is, substantially, at least $4 \times 10^{11}$ cm$^{-2}$. The term "substantially", here and throughout this document, means "within plus or minus ten percent". There is a natural limit on the electron density in the 2D electron gas of, substantially, $6 \times 10^{11}$ cm$^{-2}$, in order to avoid competition from the second electronic sub-band of the quantum wells of the heterostructure.

The target electron density can be achieved through conventional processes of doping adjustment known in the field of MBE growth, including the known use of shielding wells above and below the principal well where the 2DCCG resides.

The MBE growth tool includes a source of aluminum for the epitaxial growth of AlGaAs. A source of aluminum of high purity may be produced by purifying the aluminum source, prior to growth, by known methods. A suitable method of aluminum purification is published, for example, at Y. J. Chung et al., "Surface segregation and the Al problem in GaAs quantum wells," *Phys. Rev. Materials* 2, 034006 (2018), the entirety of which is hereby incorporated herein by reference. An interferometric device fabricated using an aluminum source produced using this purification method is described at R. L. Willett et al., "Interference measurements of non-Abelian e/4 & Abelian e/2 quasiparticle braiding," arXiv:1905.10248 (2019), the entirety of which is hereby incorporated herein by reference.

Construction of the interferometer. The interferometer constitutes a basic element of an FQHE qubit storage and computation hardware. The interferometer includes a set of surface gates formed on the heterostructure. Upon application of negative bias, the surface gates deplete the, e.g., electrons that lie directly beneath them and that lie below and in lateral proximity to them. The geometrical conformation of the surface gates creates a cell of geometric area $A_{geom}$, as described above with reference to FIGS. 1-4, for example, with a port for entry and egress at each of its two ends. Similar cells are known in the art, and it is likewise known that several cells can be joined together to form a qubit storage and manipulation hardware, as in FIG. 4, for example.

To observe and to manipulate the 17/5 and 12/5 filling factor FHQE states, it is preferable that the interferometer devices have large enclosed active areas, large lateral gaps at the backscattering ports, and one or more central top gate dots in the active area.

As will be understood from the above discussion, the geometric area $A_{geom}$ of the interferometer is defined, in an example, by the dimension from the upper to the lower side (i.e., $V_s$) electrodes, and from the lateral distance between the backscatter ($V_b$) electrodes. The side dimension of $A_{geom}$ is preferably at least 2 µm. By way of example, we have operated a prototype with a side dimension of 3 µm. This is a large area, relative to most interferometers that have been described in the technical literature. The large area is typically desired so that a large lateral dimension can be accommodated between the energized surface gate and the interior bulk electron density, i.e., the bulk electron density within area $A_{eff}$. At filling factors 17/5 and 12/5, for this large lateral dimension, the re-entrant phases of integer quantum Hall states can form within the density gradient between the interior bulk density and the edge of the surface gate.

At the filling factors 17/5 and 12/5, the re-entrant phase(s) may form in proximity to the edge of the interior bulk region of area $A_{eff}$. As explained above, the electric potential gradient due to the re-entrant phases is believed to have the beneficial effects of enhancing edge-current velocity and thus, shielding against decoherence of the FQHE carrier droplet.

Each of the entry ports has a gap width $d_g$ between the surface gates at the constrictions where the entry ports are located. These gaps in the entry ports are preferably large, like the relatively enlarged area $A_{geom}$, to better accommodate the re-entrant phases. By way of example, however, we have successfully operated prototype devices at a filling factor of 17/5 with a separation of 1.2 µm between the closest points in the entry port gates and area $A_{geom}$ having a side dimension or lateral width of about 3 µm.

A central charging dot electrode was used in prototype devices, but one or more dot electrodes centrally or non-centrally located can be used. Multiple charging dots may be useful, for example, to implement charge-transfer patterns for qubit operations such as those described above. It should be noted in this regard that not all charging dots or helper dots are necessarily charged in operation. For example, there may be operating modes in which one or more dots are maintained at ground potential.

U.S. Pat. No. 8,987,703 discusses advantageous lattice orientations for FQHE droplet devices. U.S. Pat. No. 8,362,461 discusses quantum well structures for FQHE droplet devices that contain screening wells that may be advantageous for screening impurity ions. The entirety of these patents is hereby incorporated herein by reference. U.S. patent application Ser. No. 17/582,800 describes a transparent surface gate that may be advantageous for use in FQHE droplet devices, potentially including the devices described here. The entirety of this patent application is hereby incorporated herein by reference.

Activation of the device. The process of activating the device typically includes illuminating the device with light prior to applying gate voltages, and tuning the gate voltages at the backscattering ports to producing re-entrant QHE state phases, e.g., one or more integer QHE phase regions along an edge or edges of the FQHE droplet, so that the transport of one or more edge excitations of the FQHE droplet may be enhanced.

All gate electrodes are held at ground potential during illumination, which is believed to activate the carriers from impurity sites to the 2DCCG. A useful illumination process is described, for example, in the paper by R. L. Willett et al. that was cited above. The illumination step seems to help to achieve a saturation carrier density of the 2DCCG for operation. When this density is reached, the illumination is terminated. Another effect of the illumination step is to produce uniformity in the distribution of carrier density, which can assist excitation propagation on the edges of the FQHE carrier droplet.

To benefit from re-entrant phases near or at the edge of the FQHE carrier droplet, it would be typical to tune the voltages on the entry ports so that the re-entrant phases are more likely to form along the boundary of the area $A_{eff}$. Re-entrant states have a characteristic "re-entrance" property that can be observed in the interferometer during a sweep of the applied magnetic field. This property is seen as quantization in the Hall resistance at a transverse resistance of $(1/3)h/e2$ near a filling factor of 17/5, and at a resistance of $(1/2)h/e2$ near a filling factor of 12/5. In these expressions, h is Planck's constant, and e is the absolute value of the elementary electronic charge.

Operation

Figure 6:
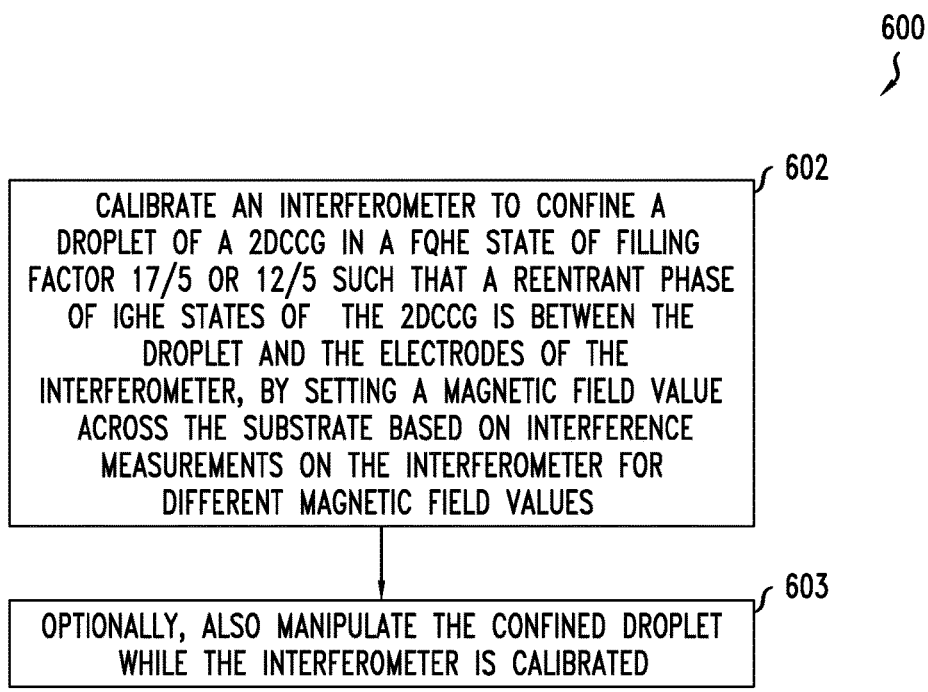
FIG. 6 is a flowchart illustrating a method for operating a device of the kind described herein.

FIG. 6 is a flowchart illustrating a general method 600 for operating various apparatus described herein. The apparatus includes a set of interferometers located along a surface of a substrate having a quantum well therein, and each interferometer has a cell and a set of gate electrodes located around the cell. The quantum well is operable to trap a 2D charge carrier gas (2DCCG) such that the trapped 2DCCG extends along the surface. Herein, some specific examples of the substrate are group III-V semiconductor heterostructure substrates including a primary quantum well having a GaAs well layer between AlGaAs barrier layers, wherein each AlGaAs barrier layer includes a shielding quantum well. Such heterostructures may include one or more silicon dopant layers located such that one of the shielding quantum wells is between each silicon dopant layer and the primary GaAs well layer. Nevertheless, the inventor does not intend that the substrate be limited to such examples of group III-V heterostructures. Indeed, other types of substrates with a quantum well for trapping a 2DCCG, e.g., other semiconductor substrate structures, may be usable in embodiments of methods and structures as described herein.

At block 602, the method 600 involves calibrating one or more of the interferometers of the set to confine a droplet of the 2DCCG in a fractional quantum Hall effect (FQHE) state of filling factor 17/5 or 12/5 in an area of the cell thereof. The calibrating is performed such that a reentrant phase of integer quantum Hall effect (IQHE) states of the 2DCCG is located between the area of the droplet of the 2DCG in a FQHE state and the electrodes of the same interferometer. The calibrating step includes setting a value of a magnetic field across the substrate such that the reentrant phase and the droplet of the 2DCCG are present in such interferometer(s) based on interference measurements on the same interferometer(s) for different values of the magnetic field. At block 602, the calibrating may also use the interference measurements to determine whether a reentrant phase of IQHE states of the 2DCCG is present in the same interferometer(s).

At block 603, further optional steps of the method 600 are illustrated, wherein such further step(s) include manipulating the confined droplet(s) while the apparatus is maintained calibrated.

For example, in some embodiments of FIG. 6, the method 600 may optionally include measuring and/or varying a topological property of the droplet of the 2DCCG confined in one or more of the interferometers while maintaining the calibration of the same interferometer(s).

For example, in some embodiments of FIG. 6, the method 600 may optionally further include, e.g., manipulating the 2DCCG while maintaining the calibration of the same interferometers to read and/or store a qubit value stored in a selected one of the calibrated interferometers, and/or to braid qubit states confined to two or more selected ones of the calibrated interferometers.

In some embodiments of FIG. 6, e.g., for which the substrate includes a GaAs/AlGaAs heterostructure, the method 600 may further include illuminating the substrate to increase a density of the charge carriers in the 2DCCG, stopping the illuminating, and then, applying voltages to the gate electrodes of the interferometers to form the droplets in the interferometers.

Figure 7:
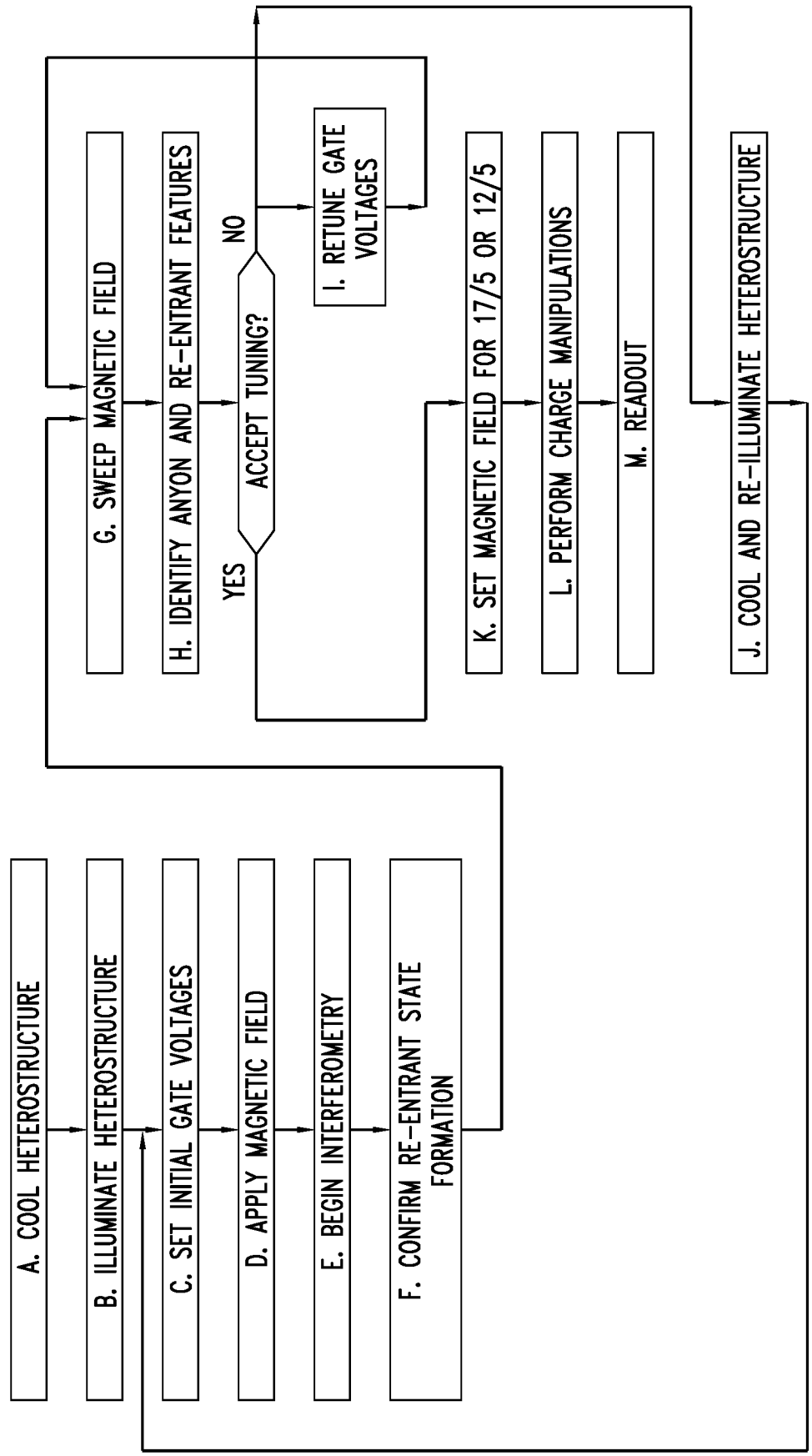
FIG. 7 is a flowchart illustrating a specific embodiment of the method of FIG. 6.

FIG. 7 is a flowchart illustrating specific examples of the processes of FIG. 6. It should be borne in mind that FIG. 7 is illustrative only, and should not be understood as limiting as to the precise natures of the various operations or the order in which they are performed.

Blocks A and B of FIG. 7 may correspond to activation block 601 of FIG. 6. At block A, the heterostructure is cooled. At block B, it is illuminated. It should be understood that although illumination has proven to be an effective approach for activating the device, it is not considered to be critical.

In experimental demonstrations, a red LED provided the illumination. The illumination is one useful approach for increasing the carrier mobility and the carrier (e.g., electron) density in the quantum well. By way of illustration, bulk carrier density for operation may lie substantially within the range $4 \times 10^{11}$ to $6 \times 10^{11}$ electrons per square centimeter.

Blocks C-K of FIG. 7 may correspond to calibration block 602 of FIG. 6.

At block C, the initial gate voltages are set. The voltages $V_b$ applied to the backscattering gates and the voltages $V_s$ applied to the side gates are typically sufficient to fully deplete the electrons of the 2DCCG in the quantum well immediately below the surface gates. One effect of this is to reduce the active region of the cell, i.e., the region having the bulk carrier density, to an area $A_{eff}$ that is smaller than the geometric area $A_{geom}$ of the cell.

A neck of the carrier gas also extends through the constrictions at the ends of the cell. However, with the gate voltages applied, the part of these necks that is at bulk density is constricted. In operation, the gate voltages will generally be tuned to produce larger or smaller amounts of confinement at the constrictions, or to affect interference signal strength in other ways. Example voltages are provided elsewhere in this discussion.

The voltage-tuning range is limited by the geometric dimensions $A_{geom}$ and $d_g$, because, for the interferometer to operate as intended, there must be a contiguous body of the 2D charge carrier gas at bulk density that can support the re-entrant phase(s) and 17/5 and 12/5 states. This contiguous body must extend through the cell, including through the constrictions at its ends. If the applied voltages are too great, the depleted region will encroach too far, and will cut off the contiguity of the bulk region within the cell. Hence, it is desirable for the cell to be fabricated with dimensions in $A_{geom}$ and $d_g$ that are large enough to support a useful voltage-tuning range.

At block D, the external magnetic field is applied. In the calibration procedure, this field will be swept through integer filling factors to determine the fundamental interference oscillation period due to an electron encircling an additional single magnetic flux quantum in the device. The period exposed by the interferometer at integer filling, where electrons are encircling the continuous addition of magnetic flux quanta as the field is swept, is the magnetic field period $F_0$ of the interference oscillation. This period relates the addition of a single magnetic flux quantum, $\Phi_0 = 41$ Gauss-$\mu m^2$, to the particular device under test in its current gate configuration. As is known in the art, determining the period $F_0$ at an integer filling factor (bearing in mind that all the integers result in the same period) allows determination of the active area $A_{eff}$, that is, $A_{eff} = \Phi_0/F_0$. The quantity $F_0$ is an important calibration factor, because it is the metric for knowing the periods at filling factors of 12/5 and 17/5 that represent non-Abelian interference.

The magnetic field will then be swept through filling factors 17/5 and 12/5 and through their surrounding re-entrant filling factors. The presence and the quality of these states are assessed through transport measurements that are made with the surface gate voltages nominally achieving depletion beneath the gates.

At block E, interferometry is initiated. Interferometry can be performed by holding the gate voltages fixed and sweeping the magnetic field, by holding the magnetic field fixed and varying the gate voltages, or by a combination of both approaches. In the present example, the gate voltages are constant and the magnetic field is swept.

Additionally, at least one central top gate can be part of the device operation. Such a gate can, e.g., hold single quasiparticle charges. In multiples, such gates can be used to transfer single quasiparticles, or can be used passively as a grounded surface layer.

The interferometric signal is obtained by measuring resistance across the cell in the longitudinal and in the transverse direction. The transverse resistance is a Hall resistance. The interference oscillations are observed within these signals.

If the surface gates are re-tuned to significantly different values, the $F_0$ value should be reassessed, to maintain accurate calibration for the periods of the target interference at 17/5 and 12/5.

At block F, there is confirmation that the gate tuning will permit formation of the phase-segregated reentrant QHE states. This can be demonstrated by adjusting the magnetic field strength to the appropriate filling factors for these states to form in the bulk region, and observing them in a resistance measurement across the device. Operation can then be performed, before or after a magnetic field sweep, by setting the magnetic field for a bulk filling factor at 17/5 or 12/5 and observing transport through the interference device for 17/5 and 12/5.

At block G, a sweep of the magnetic field is initiated, and at block H, anyon features and re-entrant features are confirmed in the resulting resistance signals.

The external magnetic field strength is swept, e.g., in an interval about the filling factor of 17/5 or 12/5, and changes in electrical resistance across one or more cells are observed. The resulting trace may exhibit oscillations of various kinds, including: Aharonov-Bohm oscillations, statistical phase oscillations (particularly for surrounding Abelian correlated states), and oscillations due to quasiparticle number change in the non-Abelian candidate states 12/5 and 17/5. The latter are confirmed if their experimental periods, as determined by calculations involving the host filling factor and the pre-measured simple electron interference $F_0$, correspond to their prescribed values.

These observations are useful for confirming whether the method is properly applied. As such, they are useful for quantum computational operations.

If the resulting resistance signal or signals are deemed acceptable, the calibration procedure can be terminated, although it may be repeated later, for example if the gate voltages are changed. However, if the magnetic field sweep does not produce a signal at the desired anyon state, for example, the gate voltages can be re-tuned as indicated at block I, and a new sweep can be performed. Alternatively the magnetic field can be extracted and the gates turned off, and a re-illumination cycle can be performed, as indicated at block J.

At block K, from observations of the desired anyon signal during the calibration, the magnetic field strength can be calibrated to produce the desired 17/5 or 12/5 FQHE state.

From observations of the desired anyon signal, the magnetic field strength can be calibrated to produce the desired 17/5 or 12/5 state.

Blocks L and M of FIG. 7 may correspond to the optional manipulation block 603 of FIG. 6 on the calibrated apparatus.

Quantum computation can then be carried out through braiding operations in the respective cells. The braiding operations are able to switch the topological states of the cells. These changed states are manifested as changes in the phase of the interference pattern that is read out as a resistance signal.

A braid is performed by localizing each component of a pair of anyons and causing current to pass between the localized anyons. Current, in this regard, may be controllable at a level of granularity as small as a single charge. The topological state is set by the braiding history of the component quasiparticles.

Suitable charge manipulations for the braiding operations are described elsewhere in this discussion. For example, the above-described process in which centrally located charging-dot electrodes, populated with e/5 charges, aid in moving a quasiparticle of charge e/5 from one side of a cell to the other side can be a fundamental topological state switch.

Various arrangements of charging dots can be implemented to facilitate the charge-transfer patterns that are desired for qubit operations. Several such arrangements are described elsewhere in this discussion.

The topological states of the cells can be measured from the edge-current interference, before and after the manipulations.

EXAMPLE

Methods overview. The following is a description of prototype devices that were prepared as samples for testing. This description is provided only as an illustrative example.

Figure 8A:
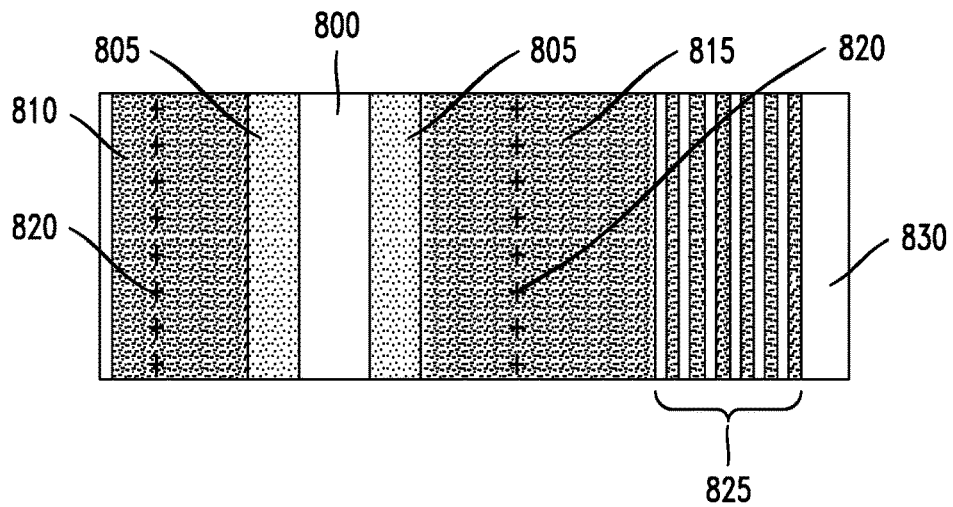
FIGS. 8A-8C are schematic cross sections, not to scale, showing the sequence of layers in each of three respective designs for a heterostructure useful as a substrate for an interference device of the kind described here.
Figure 8B:
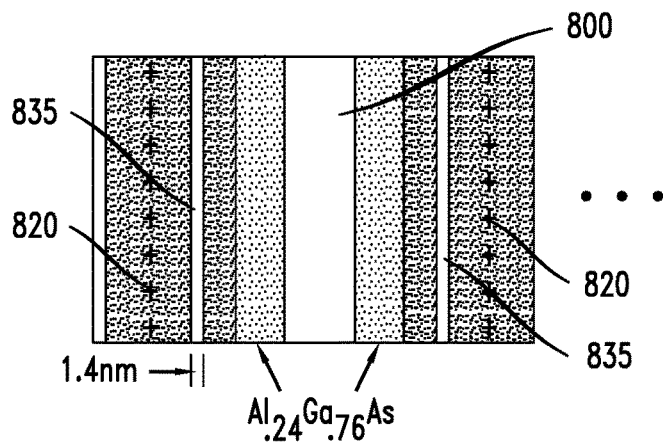
Figure 8C:
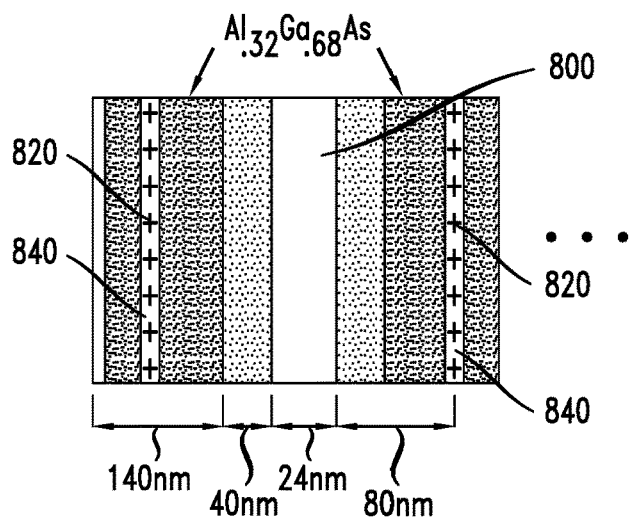

The samples included modulation-doped GaAs/AlGaAs heterostructure quantum wells with electron mobility greater than $20 \times 10^6$ cm$^2$/Vs. In one device, doping was from delta doped silicon layers on both sides of the quantum well, with a narrow intermediate shielding well of GaAs, less than 2 nm thick, between the dopant layers and the principal quantum well, which had a nominal width of 20 nm. In a different device, the silicon doping was contained within a narrow GaAs well, 1 nm thick, removed from and on either side of the principal quantum well. A basic design and these two variations are illustrated in FIGS. 8A to 8C, which are discussed in detail below. The samples that we prepared ranged in density from $3 \times 10^{11}$ to $4.5 \times 10^{11}$ electrons/cm$^2$. Highly purified Al was used in the sample preparation for the heterostructures with intermediate GaAs shielding wells.

Interferometer design. Contacts formed from Ni/Au/Ge/Ni layering were diffused into the perimeter of a mesa for containing the 2DCCG, and the areas between the contacts were left for deposition of the top gate structures that form the interferometers. After contact formation and diffusion, a 30-nm layer of amorphous SiN was deposited on the mesa to further insulate the 2DCCG from the top gate structures. The top gates were formed from Al and Au layers, Ti and Au and Al layers, or from Ti and Au layers. The top gate layers did not exceed 120 nm in thickness. The samples were illuminated to activate carriers after mounting and cooling in a dilution refrigerator, but prior to charging the top gates.

The temperature at which illumination was applied ranged from room temperature to the base temperature of 20 mK, and varied dependent upon the doping structure of the heterostructure to optimize transport quality. Illumination helps achieve maximum potential mobilities, and seems to enable achieving a higher anyon state energy gap.

The top gates were charged to a negative voltage sufficient to deplete the underlying lateral portion of the 2D electron gas layer.

As explained above, due to backscattering from the constrictions at the ends of the cell, there is interference between a current path that encircles area $A_{eff}$ and a path that does not. The interference can produce oscillations in the resistance measured across the interferometer during a sweep of the applied magnetic field. Changes in the magnetic flux number within area $A_{eff}$ or changes in the particle number within area $A_{eff}$ will vary a phase accumulation for the encircling path, but not for the direct path along one end of the cell. The changes in phase accumulation are detectable, because they affect the interference.

As noted, the active area $A_{eff}$ is, in operation, the area enclosed by the edge currents in the quantized Hall systems and is often not the full lateral area between the electrodes of the cell. Rather, the area $A_{eff}$ is electrostatically determined by the applied gate voltages. The lateral area between the electrodes of a cell in all of the prototypes that we tested was several square micrometers, but the active area $A_{eff}$ was typically less than one square micrometer. In example prototype devices that we fabricated, the full lateral area between the electrodes of a cell was roughly 9 $\mu m^2$.

Small charging dot electrodes were placed centrally in the area $A_{eff}$. Each charging dot electrode was electrically accessed by an air bridge that extended over one of the side gates, such as those marked $V_s$ in FIG. 1.

We recognized that Coulomb domination effects could potentially compete with the interference effects that we wished to observe, leading to degraded signal quality. Two design factors that helped to suppress Coulomb domination effects were the large separation between the backscattering gates, shown as distance $d_g$ in FIG. 1, and the layer design of the heterostructure. The large gate separation allowed tuning of the backscattering around small reflection amplitudes in a nearly open geometry. In a design variant referred to as the shielded well design, and described below, shielding wells above and below the principal 2D quantum well helped to inhibit charge carrier accumulation areas.

Resistance and resistance oscillations were measured using low noise lock-in amplifier techniques. A constant current (typically 2 nA) was driven through the 2D electron system as laterally defined by the surface interferometer gate structure, and the voltage, and so resistance, was determined with a four-terminal measurement.

Heterostructure designs. Our basic heterostructure design, which we refer to as the normal well design, will be described first. We fabricated prototype devices based on two variations of this basic design. These designs are schematically illustrated in FIGS. 8A to 8C, respectively. The heterostructures were grown by MBE on GaAs wafers. The backscatter-port-to-backscatter-port direction of each cell was aligned along the crystallographic [1$\bar{1}$0] direction of the substrate. If the port-to-port direction were instead aligned orthogonal to this direction, large backscattering might occur away from the backscattering ports, possibly degrading performance of the cell.

Attention is directed first to FIG. 8A. The 2D electron system resides in the GaAs layer 800 that is typically about 24 nm wide. On either side is an $Al_yGa_{1-x}As$ layer 805. The aluminum fraction x in this layer is predominantly x=24%. These sides are flanked by thick upper layering 810 and thick lower layering 815 of $Al_yGa_{1-x}As$ of higher Al fraction, x=32%. Within this highest Al section on both sides of the GaAs well are the Si dopant sheet layers 820. The dopant layer on the substrate side donates electrons to the GaAs well, and the top Si dopant layer donates carriers to both the GaAs well and the states at and near the surface of the heterostructure. Adjacent lower layering 815 is GaAs/AlGaAs superlattice 825, which is grown on GaAs substrate 830.

Turning to FIG. 8B, the shielded well design has a small addition to the fundamental well design. Between each doping layer and the quantum well, but within the 32% Al fraction layer, are placed thin wells 835 of GaAs, about 1 nm in thickness. These layers, on either side of the 2D system in the central 24-nm quantum well, accept a low density of electrons, and they demonstrate some parallel conduction in magneto-transport measurements, confined to low magnetic fields.

These layers provide two functions. First, the shield layers appear to provide a smoothing effect on the potentials presented by the ionized doping layers, resulting in stronger electron correlations in the central well. This may produce a high mobility and thus, larger correlated state gaps. Second, the shield layers can shield the central well itself.

Turning to FIG. 8C, the doping well design is distinguished in that the Si dopants are placed in narrow GaAs wells within the high Al concentration layers. This design has demonstrated high mobilities and large fractional quantum Hall state gaps. However, it is less suitable for interferometry, because the surface gates do not modulate the underlying 2D electron system density in a usable way at operational temperatures. Hence, the only method by which these structures can be used for interferometry is to set the gates at working voltages at higher temperatures, for example at about 4K, and to operate at base temperatures performing only magnetic field sweeps.

Performance optimization can be achieved empirically. The parameter set for optimization includes doping levels, shielded well and doping well widths, widths of intermediate layers of high Al concentration, central well widths, temperatures for deposition at each of these stages, and cap layer thicknesses.

Aluminum purity. As noted above, using aluminum source material of high purity seems helpful for achieving high carrier mobilities. A suitable method for purifying the Al source material has been published at Y. J. Chung et al., "Surface segregation and the Al problem in GaAs quantum wells," *Phys. Rev. Materials* 2, 034006 (2018), which was cited above. The purification method involves offline bakes of the Al-effusion furnaces.

We have also improved sample purity by installing a 17K cold plate in the MBE chamber, very close to the sample growth space, to establish a cleaner growth environment. We have also placed large-area 19K cryogenic cold plates in the vacuum sump of the MBE growth chamber. Residual gas analysis shows that these plates can reduce the nitrogen impurities in the MBE vacuum by a factor of twenty, and they also can reduce the water impurities by a factor of three.

Sample illumination and gating processes. Illumination may be accomplished by exciting a red LED positioned over the sample. Illumination has been performed, e.g., at a temperature below the 2D electron Fermi energy, which is about 100K.

The optimal duration of illumination and the optimal temperature or temperatures at which the light is applied are specific to the devices under preparation, and may be determined by empirical experimentation. By way of example, we successfully prepared doping well samples with continuous illumination during cool-down from room temperature to 4K, at which point the illumination was stopped.

A similar procedure can be used in shielded well samples. However, at least some of our shielded well devices allowed for a range of possible protocols for illumination. For example, we had successful trials with the red LED on from room temperature to 4K, to 1K, and to near the base temperature, which was below 100 mK. (Base temperature may not be achievable with illumination on.) We also had successful trials with the red LED turned on only at base temperature for a brief period of about one minute, after which the system was allowed to re-cool to a base temperature of 20 mK.

The examples of shielded well embodiments seemed more tolerant of variations in the illumination process than the examples of doping well embodiments.

The gates are energized after illumination, with the LED light source turned off. For the doping well devices, we found that the gates could be successfully charged at 4K.

We have some evidence that if illumination is applied at low temperature or at base temperature, transport subsequent to gating can be improved if the gates are charged while the sample is still warmed from the illumination.

Additional design considerations. As noted, the active cell area is the area bounded by an edge current whose charge corresponds to the bulk filling factor. It should be noted, however, that a series of edge currents will populate the space from the innermost edge where the bulk edge current is located, out to the fully depleted edge. These currents will correspond to the states between the bulk filling factor and zero filling factor. For proper operation of the interferometer, reflection should primarily be only of the innermost edge currents.

The gate electrode borders that define $A_{geom}$ in our prototype devices had dimensions ranging from 2 μm×2 μm to 6 μm×6 μm. The depth of the 2D electron system in all of our prototype devices was approximately 200 nm from the surface. The applied gate voltages were between 2V and 10V. An applied voltage of 2V achieved full depletion in a sample of density $4\times10^{11}$ cm$^{-2}$. These voltages and dimensions determine that the active areas are on the order of one square micrometer or less.

An important parameter is the width of the backscattering gates. The width of the gate is the path length over which the edge currents are brought into proximity. The gate width and the separation $d_g$ define the potential tunneling paths for the edge currents, and they determine the transparency of the constrictions. An effective gate width may be determined empirically.

The voltage applied to the backscattering gates typically depletes the underlying 2D electrons. The separation between the gate electrodes accommodates this condition. In practice, a large separation $d_g$ can be compensated by a large range in applied gate voltages. Typical values for $d_g$ are about 1 μm, with an applied voltage of 4V.

Figure 9:
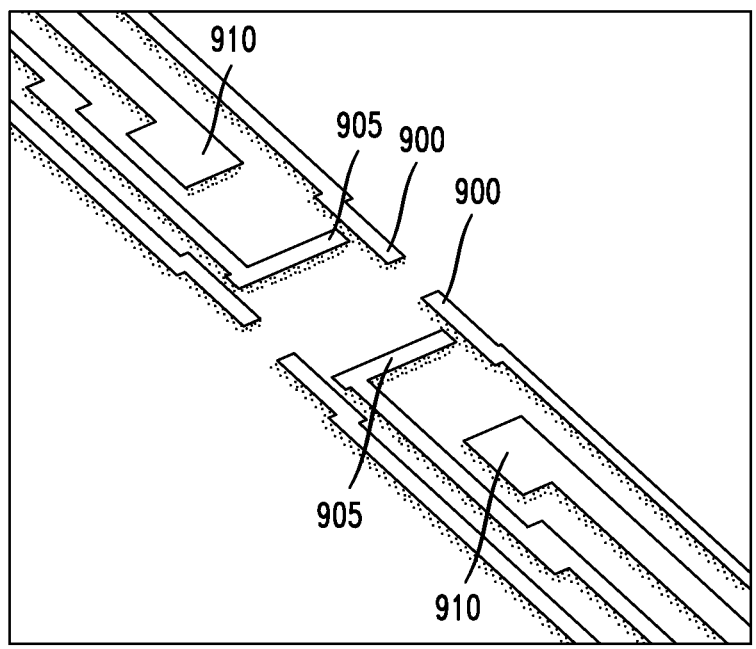
FIG. 9 is an electron microscopic image of a portion of a prototype device of the kind described here.

FIG. 9 is an electron microscopic image of a portion of a prototype device. The backscattering gates 900 and the side gates 905 are visible in the image. A geometrical separation, i.e., a separation as defined for fabrication, of 3 μm between the side gates is indicated in the figure. The two large pads 910 seen in figure are landing pads for airbridges, which could connect to dot electrodes overlying the active area.

It should be noted that the surface gates shown in the figure are not used to inject charge into, or extract charge from, the 2D carrier gas. Accordingly, they are not diffused into the heterostructure to make contact with it, but rather, they are used for carrier depletion.

The metal contacts, which are not visible in FIG. 9, are layered stacks of different metals. They were deposited in specific locations away from the surface gates, and thermally diffused through the top heterostructure layers to the quantum well. The surface gates were patterned and deposited after the contact diffusion.

It is noteworthy that in use, there is effective electrical isolation between the landing pads and the contiguous region of carrier gas that extends longitudinally through the cell. That is because, when the surface gates are charged to achieve electron depletion, there remains no continuous current path connecting the pads to the contiguous 2D charge carrier gas region. The slight opening, seen in the figure, that lies between the side gates and the backscatter gates is so small that full depletion occurs between them.

Figure 10:
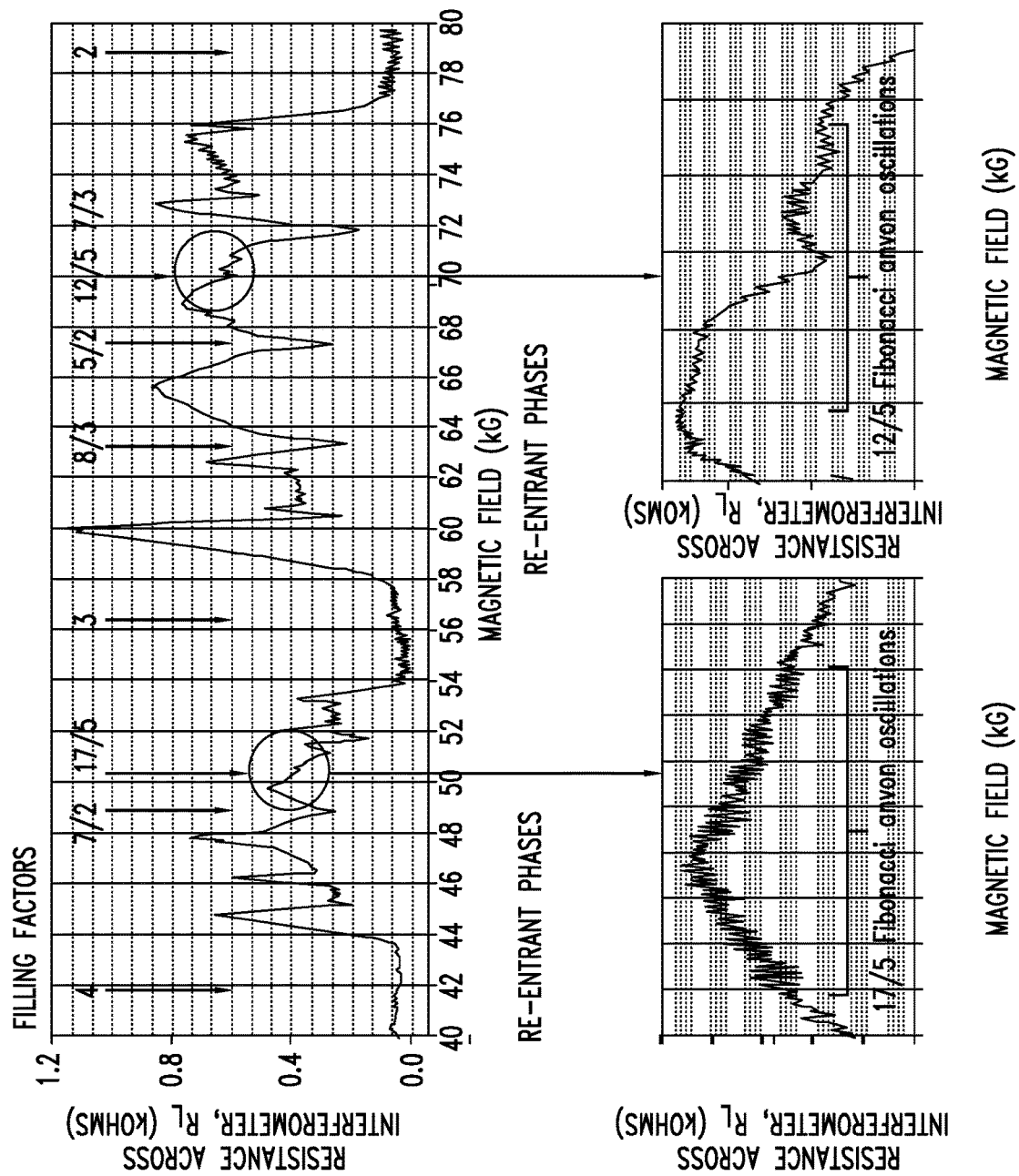
FIG. 10 is a graph of experimental measurements performed on a prototype device

Results. FIG. 10 is a graph of experimental measurements performed on a prototype device of the shielded well design, substantially as described above. In the main part of the figure, electrical resistance, in kilo-Ohms, is plotted as a function of the applied magnetic field, in kilo-Gauss. The horizontal axis ranges from 40 kG to 80 kG. The vertical axis ranges from 0 kΩ to 1.2 kΩ. Signatures of various excitations are seen as peaks and valleys in the main part of the figure.

In the experimental study, the applied magnetic field was swept over the range indicated in the graph. The backscattering and side gate voltages were both −2V. Current through the device was 5 nA.

The integer filling factors within range of the magnetic field scan are 4, 3, and 2. Their positions in the scan are indicated on the graph in the main part of the figure. Certain fractional filling factors, which correspond to features in the graph, are also indicated. They are the factors of 7/2, 17/5, 8/3, 5/2, 12/5, and 7/3. Signatures of the re-entrant phases near 7/2 and 5/2 are expressly called out. In addition, the signatures of the Fibonacci anyon states at 17/5 and 12/5 are expressly called out, and are shown in magnified view in respective insets to the figure.

Figure 11:
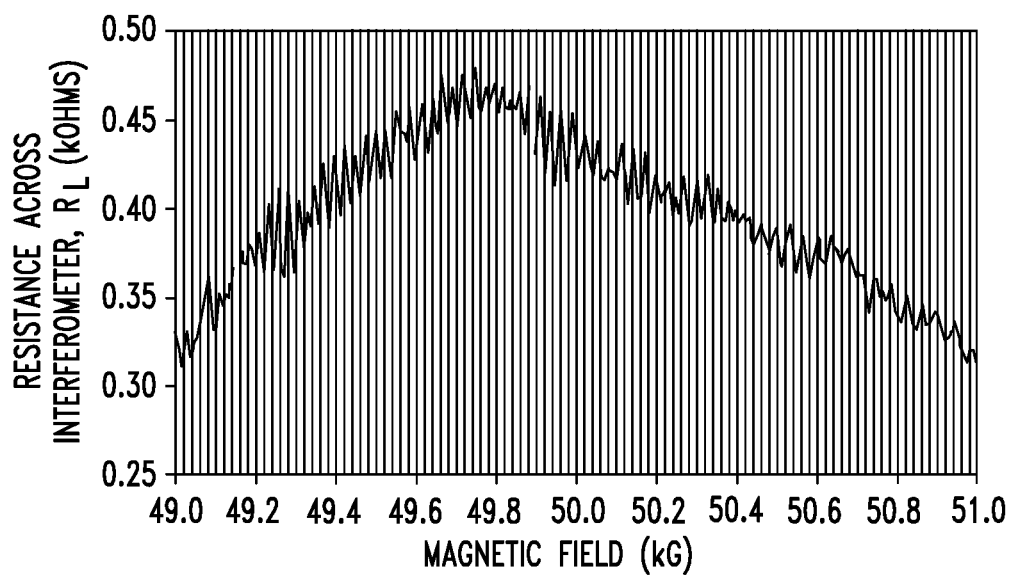
FIG. 11 is a magnified view of the inset of FIG. 10 for a particular state under observation, referred to here as the 17/5 state.

FIG. 11 is a magnified view of the inset of FIG. 10 for the 17/5 state. As seen in the figure, Fibonacci anyon oscillations are present, and are distributed around the magnetic field value corresponding to the 17/5 filling factor.

The oscillations shown in FIG. 11 have a period of about 0.025 kG. This corresponds in our experimental arrangement to the approximate amount of magnetic flux change required to add three Fibonacci anyons of charge e/5 to the cell population at a filling factor of 17/5. Oscillations are observed because the topological states available to a system of Fibonacci anyons change as the number of quasiparticles changes, but in such a way that about three quasiparticles must be added to return to interference expression similar to the original topological state. Because the phase changes of the circulating edge current in the cell depend on the topological states of the quasiparticle population, the interferometer signal is periodic.

From the definition of filling factor, there are, at a filling factor of 17/5, seventeen electrons per $5\Phi_0$, where $\Phi_0$ is the flux quantum. At a quasiparticle charge of e/5, there are five quasiparticles per electron. Together, these results imply that a flux increment of $\Phi_0$ creates 17 quasiparticles of charge e/5. Hence, to add three such quasiparticles requires a flux increment of $(3/17)\Phi_0 = \Phi_0(1/5.666)$. The observation of oscillations near this period is confirmation that Fibonacci anyons are in fact being observed.

More specifically, the measured period at 17/5 obeys the calibration of the period $F_0$ at integer filling factor, wherein $F_0$ is the period to add one flux quantum, and wherein $A_{\mathit{eff}} = \Phi_0/F_0$. With a fixed $A_{\mathit{eff}}$ at integer and 17/5 filling factors, consistency with Fibonacci anyons is demonstrated by a measured period at 17/5 near $(3/17)F_0 = F_0(1/5.666)$.

Figure 12:
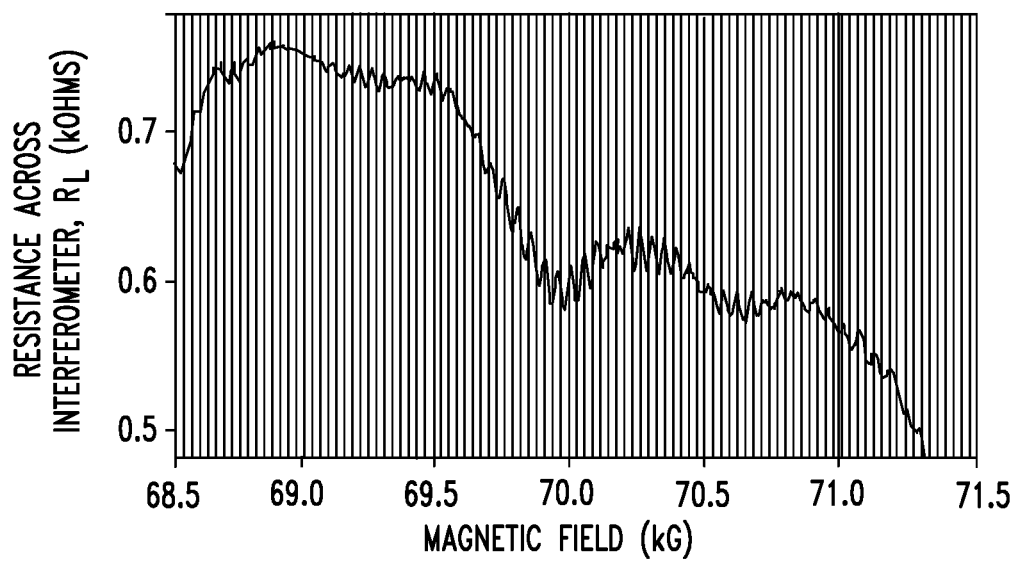
FIG. 12 is a magnified view of the inset of FIG. 10 for a particular state under observation, referred to here as the 12/5 state.

FIG. 12 is a magnified view of the inset of FIG. 10 for the 12/5 state. As seen in the figure, Fibonacci anyon oscillations are present, and are distributed around the magnetic field value corresponding to the 12/5 filling factor. These oscillations also have the predicted period for additions of roughly three quasiparticles of charge e/5 as the magnetic field is swept.

What is claimed is:

1. A method for operating an apparatus including a set of interferometers located along a surface of a substrate, the substrate having a quantum well operable to trap a 2D charge carrier gas such that the trapped 2D charge carrier gas extends along the surface, each interferometer having a cell and a set of gate electrodes located around the cell, the method comprising:
   calibrating each one of the interferometers to confine a droplet of the 2D charge carrier gas in a fractional quantum Hall effect state of filling factor 17/5 or 12/5 in an area of the cell thereof while a reentrant phase of integer quantum Hall effect states of the 2D charge carrier gas is located between the area of the droplet of the 2D charge carrier gas in a fractional quantum Hall effect state and the electrodes of the one of the interferometers;
   wherein the calibrating includes setting a value of a magnetic field across the substrate such that the reentrant phase and the droplet of the 2D charge carrier gas are present in at least one of the interferometers based on interference measurements on the at least one of the interferometers for different values of the magnetic field; and
   illuminating the substrate to increase a density of the charge carriers in the 2D charge carrier gas, stopping the illuminating, and then, applying voltages to the gate electrodes to form the droplets in the interferometers.

2. The method of claim 1, further comprising:
   measuring or varying a topological property of the droplet of the 2D charge carrier gas confined in one or more of the interferometers of the set while maintaining the calibration of the interferometers.

3. The method of claim 1, further comprising:
   manipulating the 2D charge carrier gas while maintaining the calibration of the interferometers to perform at least one of:
   read a qubit value stored in a selected one of the calibrated interferometers,
   store a qubit value to the selected one of the calibrated interferometers, and
   perform a braid operation of qubit states confined to two or more selected ones of the calibrated interferometers.

4. The method of claim 1, wherein the substrate includes a group III-V semiconductor heterostructure comprising:
   a primary quantum well having an InGaAs or GaAs well layer between AlGaAs barrier layers, each AlGaAs barrier layer including a shielding quantum well; and
   at least one silicon dopant layer located such that one of the shielding quantum wells is between the silicon dopant layer and the InGaAs or GaAs well layer.

5. The method of claim 1, wherein the calibrating comprises using the interference measurements to determine whether a reentrant phase of integer quantum Hall effect states of the 2D charge carrier gas is present in the at least one of the interferometers.

6. The method of claim 1, wherein the calibrating further comprises, in response to determining that a reentrant phase is not present in the at least one of the interferometers:
   re-illuminating the substrate; and
   after stopping the re-illuminating, using interference measurements to determine whether a reentrant phase of integer quantum Hall effect states of the 2D charge carrier gas is present in the at least one of the interferometers.

7. The method of claim 6, wherein the calibration further comprises, while varying the magnetic field, measuring oscillations in the interference measurements due to some or all of: Aharonov-Bohm oscillations, statistical phase oscillations, and oscillations due to a quasiparticle number change of a non-abelian state for the filling factor 12/5 or the filling factor 17/5.

8. The method of claim 7, wherein the calibration further comprises, in the event of a failure to observe oscillations of a type selected from the set consisting of Aharonov-Bohm oscillations, statistical phase oscillations, and oscillations due to quasiparticle number change in non-abelian states associated with the filling factor 12/5 or the filling factor 17/5:
   re-illuminating the substrate; and
   after stopping the re-illuminating, repeating the varying the magnetic field and, while varying the magnetic field, measuring oscillations in the interference measurements due to some or all of: Aharonov-Bohm oscillations, statistical phase oscillations, and oscillations due to quasiparticle number change of a non-abelian state for the filling factor 12/5 or the filling factor 17/5.

9. The method of claim 1, wherein the charge carriers of the 2D charge carrier gas are electrons and the illuminating causes a bulk density of the electrons in the 2D charge carrier gas to be greater than, substantially, $4 \times 10^{11}$ per square centimeter of the surface.

10. The method of claim 1, wherein each one of the interferometers includes a set of side electrodes and a set of backscattering electrodes, and the method further comprises:
    applying voltages to the side electrodes of a specific one of the interferometers to deplete an area around the cell of the specific one of the interferometers of the 2D charge carrier gas; and
    adjusting voltages applied across the backscattering electrodes of the specific one of the interferometers to change a backscattering of edge excitations of the droplet in the specific one of the interferometers.

11. The method of claim 10, wherein a pattern comprising one or more dot electrodes overlies the cell of the specific one of the interferometers, the one or more dot electrodes being electrically isolated from the side and backscattering electrodes of the specific one of the interferometers; and
    the method further comprises applying a voltage to a selected one of the dot electrodes of the dot pattern such that a charge becomes localized in the 2D charge carrier gas near the selected dot electrode.

12. The method of claim 11, further comprising:
    varying a voltage applied to the selected dot electrode such that a charge becomes localized in the 2D charge carrier gas near a different one of the one or more dot electrodes.

13. The method of claim 11, further comprising:
varying a voltage applied to the selected dot electrode such that a charge moves between adjacent facing backscattering electrodes.

14. The method of claim 10, further comprising:
varying a voltage applied to the selected dot electrode such that a charge is shifted from a localized position at the selected dot electrode to one of the side electrodes or one of the backscattering electrodes of the specific one of the interferometers.

* * * * *